United States Patent [19]

Bichler et al.

[11] Patent Number: 5,078,341
[45] Date of Patent: Jan. 7, 1992

[54] INLET RAMP FOR SUPERSONIC OR HYPERSONIC AIRCRAFT

[75] Inventors: Bartholomäus Bichler, Raubling; Michael Jost, München, both of Fed. Rep. of Germany

[73] Assignee: Messerschmitt-Bölkow-Blohm GmbH

[21] Appl. No.: 671,120

[22] Filed: Mar. 18, 1991

[30] Foreign Application Priority Data

Mar. 20, 1990 [DE] Fed. Rep. of Germany ....... 4008951

[51] Int. Cl.$^5$ ............................................. B64D 33/02
[52] U.S. Cl. ........................... 244/53 B; 137/15.1
[58] Field of Search ................. 244/53 B; 137/15.1, 137/15.2; 60/270.1

[56] References Cited

U.S. PATENT DOCUMENTS

| | | |
|---|---|---|
| 3,161,379 | 12/1964 | Lane ........................... 60/270.1 X |
| 3,265,331 | 8/1966 | Miles ........................... 244/53 B |
| 3,324,660 | 6/1967 | Lane et al. ................... 60/270.1 X |
| 3,589,379 | 6/1971 | Daues et al. ................... 137/15.1 |
| 3,717,163 | 2/1973 | Herr ............................... 137/15.1 |
| 4,012,013 | 3/1977 | Ball et al. ...................... 137/15.1 |
| 4,418,879 | 12/1983 | Vanderleest .................... 244/53 B |
| 4,641,678 | 2/1987 | Haas et al. ..................... 244/53 B |
| 4,919,364 | 4/1990 | John et al. ................... 244/53 B X |

*Primary Examiner*—Joseph F. Peters, Jr.
*Assistant Examiner*—Carla Mattix
*Attorney, Agent, or Firm*—Toren, McGeady & Associates

[57] ABSTRACT

An hydraulically-pivotable inlet ramp with box-like shaped cross-section for supplying air into engines of supersonic or hypersonic airplanes. The inlet ramp, comprised of a plurality of relatively movable elements, can be adjusted into a number of different positions to optimize air flow under various mach conditions, as well as control a boundary air layer inlet.

13 Claims, 3 Drawing Sheets

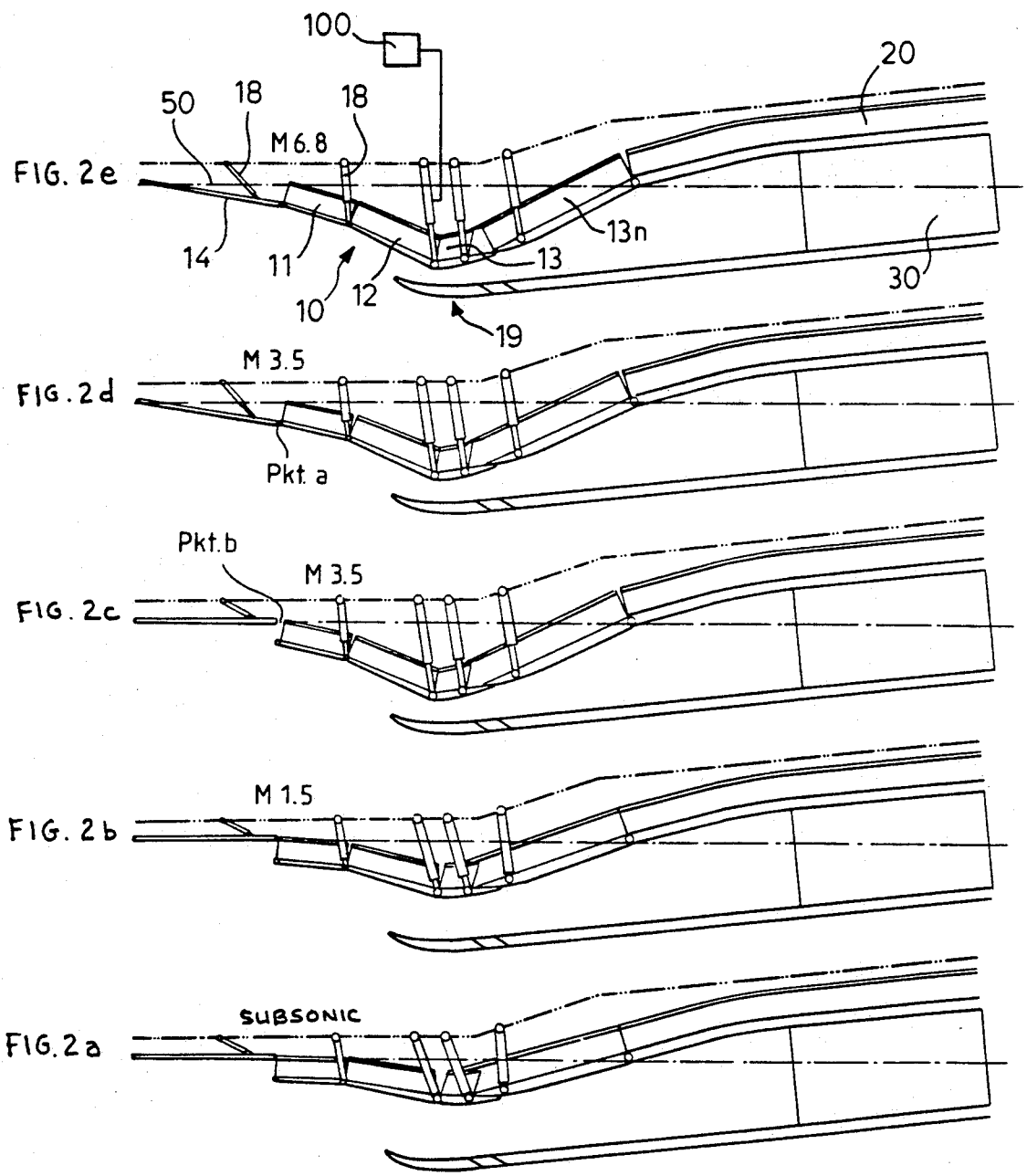

INLET RAMP FOR SUPERSONIC OR HYPERSONIC AIRCRAFT

The invention relates to an inlet ramp for supersonic or hypersonic aircraft.

BACKGROUND OF THE INVENTION

Inlet ramps for supersonic airplanes are known, and several different embodiments are described, for instance, in U.S. Pat. Nos. 3,717,163 and 4,418,879, whose contents are hereby incorporated by reference. All these cases deal with so-called turbo jet or ram jet inlets, where air is supplied to the engine by means of a ramp plate or an individual ramp box or, in the case of auxiliary power plants, the inlet can be closed off when the ramp is pivoted inwards. These embodiments are, however, not suited for parallel arrangements of two separate and different air inlets, as well as for conditions in the high supersonic and hypersonic range.

SUMMARY OF THE INVENTION

The main object of the present invention is an air intake system of the mentioned type, where the inlet ramp serves for control of the air supply to the engine inlet as well as for evacuation of the boundary layer air, and which is suitable for all inlet variations, while at the same time being usable flow-technology and strength-wise in the high supersonic and hypersonic modes of operation.

In accordance with one aspect of the invention, an inlet ramp is provided comprising a plurality of relatively moveable box-like elements pivotably mounted on the airplane fuselage.

The advantages of the invention flow from the mobile individual segments of the inlet ramp, which is always pivotable across its entire length into a very flow-favorable shape, and wherein the cross section of the air intake in the critical region upstream of its inlet can be varied very accurately and thus the so called pumping and hum detrimental for the engine can be eliminated.

At the same time, the boundary air layer which can develop to be very thick at high flight speed, for instance, at the bottom of the fuselage, can be bled-off or evacuated through the box shaped or possibly round, in any case closed, cross-section of the inlet ramp. This boundary layer air, whose quantity can be also controlled by a pivotable inlet plate, can be directed into a boundary layer inlet extending substantially parallel to the engine inlet and blown further to the rear, without the inlet performance of the engine being affected by this detrimental boundary layer. This boundary layer air can also be used by being injected into the tail area of the aircraft, in order to reduce the tail resistance, or the energy rich boundary layer air can be supplied in an advantageous manner to a ram jet engine.

In addition, the inlet ramp in total or in part can be readily pivotable around several axial directions, so that said ramp can be adapted to differing aircraft shapes.

Further, with respect to the high torsional twisting moment, also the high moment of resistance is very advantageous in the inlet ramp according to the invention, because of the closed (box-shaped or round) construction, in order to be able to carry without any vibration the high forces occurring hypersonically especially in the inlet lip region without any vibrations. This is achieved without impairing the control accuracy of the inlet ramp caused, for instance, by bending or warping.

Still further, the inlet ramp can be stiffened or braced on the inside for strength or stiffness reasons and, in addition, all high temperature resistant materials can be used to make the ramp, for instance, from such materials as fiber composites, ceramics or derivatives.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

In the drawings:

FIGS. 2a-2e show an inlet ramp according to the invention in cross-section in different positions of the individual ramp elements under conditions of different mach numbers;

DETAILED DESCRIPTION OF THE PREFERRED EMBODIMENTS

Figure 1:
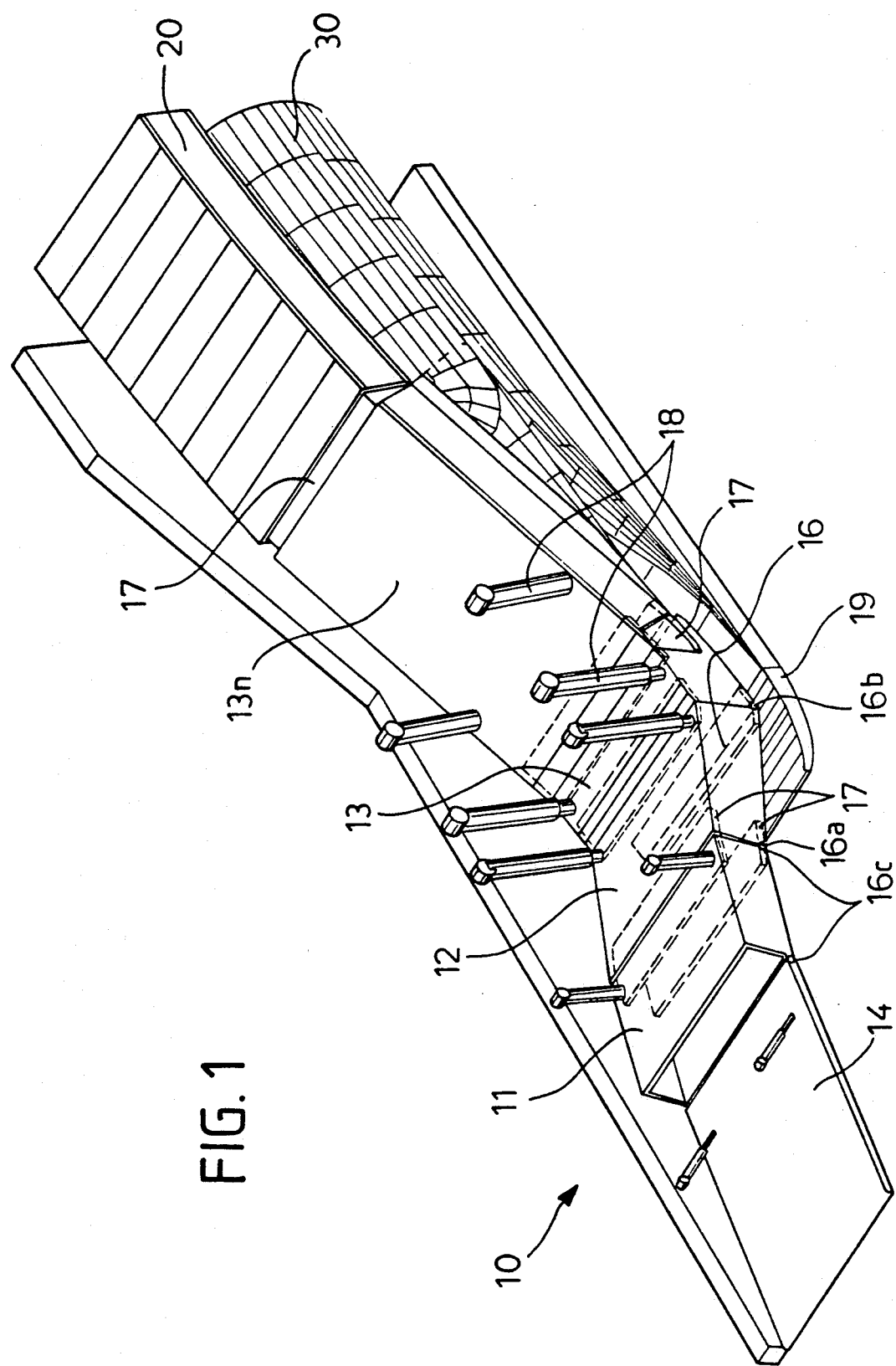
FIG. 1 is a perspective view of one form of an inlet ramp according to the invention for an aircraft fuselage.

FIG. 1 shows according to the invention a preferred embodiment of an inlet ramp 10 assigned and mounted to an engine intake 30. This inlet ramp 10 is composed of several hollow box-like elements 11, 12, 13 . . . 13n, which can also be round, and which in this example are four in number and are pivotable downward by means of hydraulic actuators 18. Depending on the aircraft configuration, other directions of pivoting are also possible.

These box-like elements 11–13n are supported to be mobile or movable with respect to one another and are pivotable into different positions. They discharge into the boundary layer inlet 20 arranged, for instance, on the engine inlet 30 and extending substantially parallel thereto, and direct the undesirable boundary layer air developed in flight at the external contour 50 of the not-shown fuselage of the aircraft into said boundary layer inlet 20. This boundary layer air being ejected further rearward at the fuselage, can advantageously be supplied to the tail or, being air rich in energy, to a ramjet engine.

The quantity of boundary layer air suppliable to the boundary layer inlet 20 can, as is seen in FIG. 2, be controlled by means of an inlet plate 14 pivotably arranged at the air inlet side (hollow box intake) of the boundary layer inlet 20. For aerodynamic reasons and in order to avoid high stress, the inlet plate 14 is pulled preferably upwards against the outer contour 50 by means of a hydraulic cylinder 18. This is shown in FIG. 2 in the two mach 3.5 FIGS. 2c and 2d, wherein the position from point a to point b defines the open position.

On the other hand, the main task of the pivotable inlet ramp in FIG. 2 consists in appropriately narrowing the contour of the cross-section of the engine inlet 30 in the region of the intake lip 19 with increasing mach numbers, from subsonic (FIG. 2a) to approximately mach 6.8 (FIG. 2e), by means of a flow-friendly contour. This is achieved in a very efficient way in spite of the high flow stresses by means of the mutually displaceable hollow box elements 11-13 having a smooth contour and designed in a very efficient way to be adapted to the contour shape of the inlet lip 19, which thereby accurately prevent the supply of excess air, which endangers the operation of a gas turbine engine as well as that of a ram jet engine.

Figure 3A:
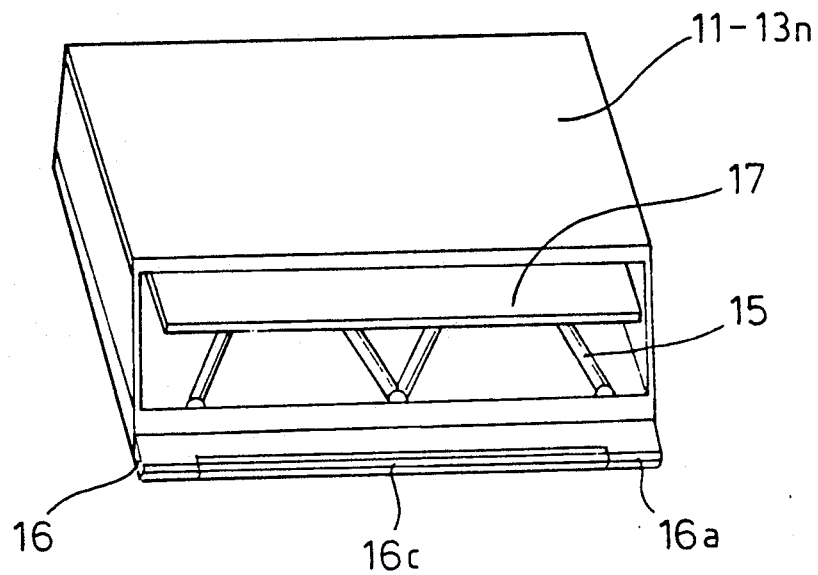
FIG. 3a is a perspective view of one form of a ramp hollow box element according to the invention.
Figure 3B:
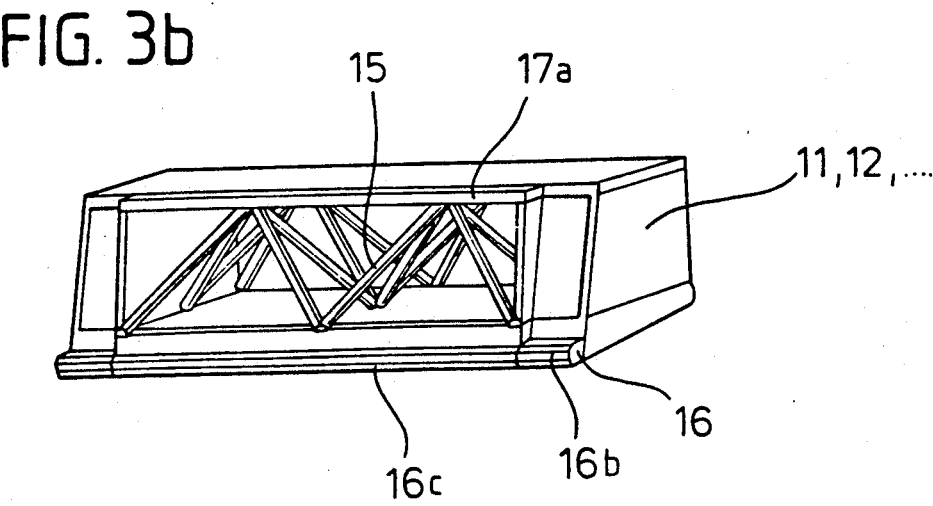
FIG. 3b is a perspective view of a variant of a ramp hollow box element.

The box elements 11-13 provide, as has already been described, quite adequate strength and stiffness against the enormously high forces because of the design shape as illustrated, for instance, in FIGS. 3a and 3b, which forces occur at flight speeds in the hypersonic range when narrowing the engine intake with simultaneous evacuation of the boundary layer through the boundary layer inlet 20. When the box elements are pivoted, there necessarily arise gaps and slots between the respective elements which must be covered at least at the top and bottom faces of the element transitions. This is achieved by a spring band steel element 17 engaging into the respective box inner cavity. In order to also seal the side faces of the gaps, this spring band steel element 17 can also be designed to be box shaped. Furthermore, the box elements 11-13n in addition to the stiffenings and bracings of struts 15 arranged in the inside space, can also be provided with a spring steel band frame 17a insertable and projectable on all sides into the cavity of the adjacent neighboring box element or into the boundary layer inlet 20, at their end when viewed respectively in the engine inlet direction.

The box elements 11-13n are connected with each other by an articulated bearing 16c in a mobile manner, and it is also possible to connect the inlet plate 14 in this manner. A variant provides that the bottom face edges 16 of the box elements 11-13n are designed at one end as a groove and at the other end as a spring 16b, which respectively engage into the complementary-designed form of the adjacent box element.

The inlet plate 14 as well as the box elements 11-13n are suspended and pivotably guided at the fuselage by means of hydraulic cylinders 18 or spindles, and can be controllable by a computer 100 in a well-known manner.

FIGS. 2a-2e show the preferred positions of the box-like elements 11-13 and the inlet plate 12 for the respective conditions noted in the figures, namely, subsonic, mach 1.5, 3.5, 3.5, and 6.8, in which the engine inlet cross-section is varied, as well as evacuation of the boundary air layer.

The inlet ramp 10 and the associated individual parts can be manufactured from all materials resisting high temperature, as well as out of fiber- and ceramic-composite materials.

While the invention has been described in connection with preferred embodiments, it will be understood that modifications thereof within the principles outlined above will be evident to those skilled in the art and thus the invention is not limited to the preferred embodiments but is intended to encompass such modifications.

We claim:

1. An inlet ramp for a variable air supply to air inlets in supersonic and hypersonic aircraft and capable of changing its cross-section to vary the air supply to the aircraft engine inlet, comprising a plurality of hollow box-like elements, means for supporting said box-like elements so as to be mobile and pivotable against each other, a pivotable inlet plate connected to the upstream hollow box-like element for controlling the air supply to a boundary layer inlet adjacent the aircraft fuselage and extending substantially parallel to the engine inlet.

2. An inlet ramp according to claim 1, further comprising hydraulic actuators for pivoting the box-like elements to different positions.

3. An inlet ramp according to claim 1, wherein said inlet ramp is made up from materials with high temperature resistance.

4. An inlet ramp according to claim 1, characterized in that stiffening struts are arranged in the cavity of at least one of the hollow box-like elements.

5. An inlet ramp according to claim 1, further comprising an articulated bearing for connecting respectively two adjacent box-like elements or a box-like element with the inlet plate.

6. An inlet ramp according to claim 1, comprising hydraulic cylinders for pivotably guiding each hollow box-like element and the inlet plate.

7. An inlet ramp according to claim 1, wherein the engine inlet has a fixed inlet lip, and the bottom surface of the hollow box-like elements located above the fixed inlet lip has a shape generally matching the fixed inlet lip.

8. An inlet ramp according to claim 1, further comprising a computer for controlling the pivoting of the entire inlet ramp or of its individual element.

9. An inlet ramp for a variable air supply to air inlets in supersonic and hypersonic aircraft and capable of changing its cross-section, comprising a plurality of hollow box-like elements, means for supporting said box-like elements so as to be mobile and pivotable against each other, a pivotable inlet plate connected to the upstream hollow box-like element for controlling the air supply to a boundary layer inlet extending substantially parallel to the engine inlet, said hollow box-like elements being configured at one end as a groove and at the other end as a spring which respectively engage into the complementary spring and groove of the neighboring hollow box-like element.

10. An inlet ramp for a variable air supply to air inlets in supersonic and hypersonic aircraft and capable of changing its cross-section, comprising a plurality of hollow box-like elements, means for supporting said box-like elements so as to be mobile and pivotable against each other, a pivotable inlet plate connected to the upstream hollow box-like element for controlling the air supply to a boundary layer inlet extending substantially parallel to the engine inlet, said hollow box-like elements being configured at one end with a spring steel band which are respectively insertable and engage into the cavity of the neighboring hollow box-like element or into the boundary layer inlet.

11. An inlet ramp for a variable air supply to air inlets in supersonic and hypersonic aircraft and capable of changing its cross-section, comprising a plurality of hollow box-like elements, means for supporting said box-like elements so as to be mobile and pivotable against each other, a pivotable inlet plate connected to the upstream hollow box-like element for controlling the air supply to a boundary layer inlet extending substantially parallel to the engine inlet, said hollow box-like elements being configured at one end, viewed in the engine inlet direction, with a spring steel band frame which is respectively projectable on all sides and insertable and engage into the cavity of the neighboring hollow box-like element or into the boundary layer inlet.

12. An inlet ramp for a variable air supply to air inlets in supersonic and hypersonic aircraft and capable of changing its cross-section, comprising a plurality of hollow box-like elements, means for supporting said box-like elements so as to be mobile and pivotable against each other, said hollow box-like elements being constituted of high temperature resistant materials and forming a closed pivotable duct for varying the cross-section of the aircraft power plant inlet duct of the inlet ramp and for simultaneously evacuating the boundary layer air adjacent the aircraft fuselage.

13. The device of claim 12, wherein the duct formed by the box-like elements is located above the power plant inlet and between the latter and the aircraft fuselage.

* * * * *